Aug. 18, 1942.  O. J. CROWE  2,293,493
BEAD MOLDING AND PROCESS OF MANUFACTURE
Filed Dec. 29, 1939
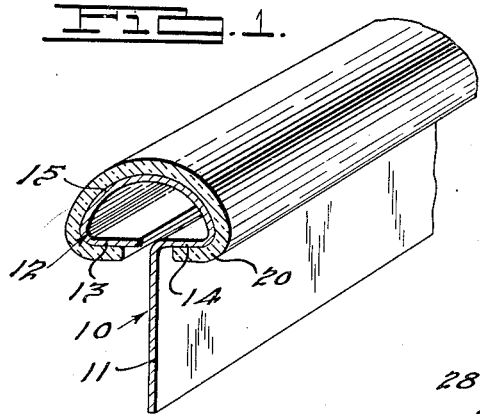
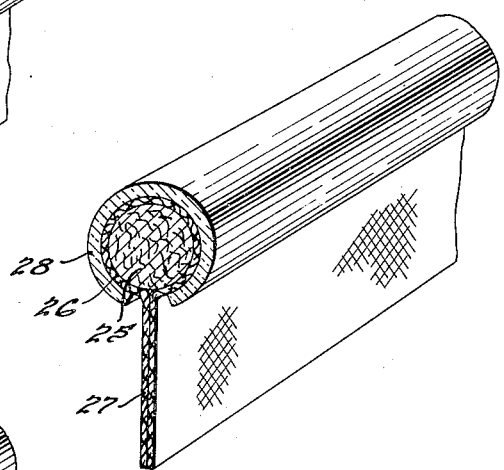
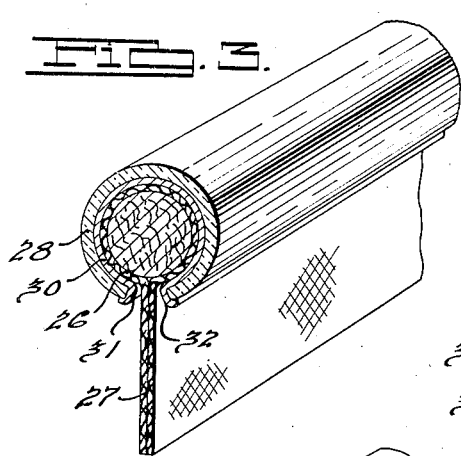
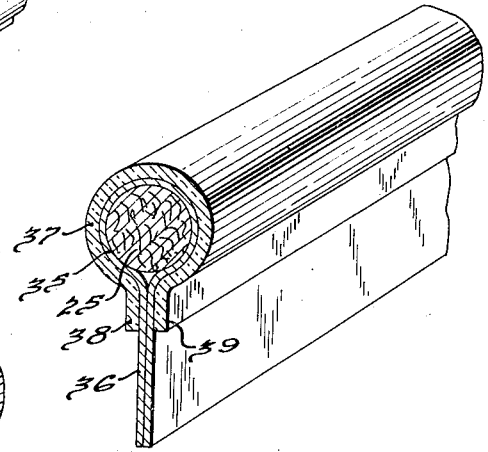
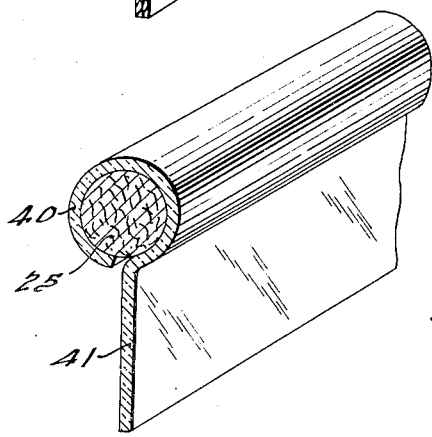
INVENTOR
Orley J. Crowe.
BY
Harness, Dickey & Pierce.
ATTORNEYS.

Patented Aug. 18, 1942

2,293,493

UNITED STATES PATENT OFFICE 2,293,493

BEAD MOLDING AND PROCESS OF MANUFACTURE

Orley J. Crowe, Detroit, Mich.

Application December 29, 1939, Serial No. 311,636

5 Claims. (Cl. 280—153.5)

The invention relates generally to molding and it has particular relation to a bead molding to be employed on automobiles or in similar fields of application.

One object of the invention is to provide an improved bead molding of inexpensive construction, which has an improved and enhanced appearance, and which may be applied easily and efficiently.

Another object of the invention is to provide a bead molding which may be bent and curved easily in order to facilitate application of the molding along irregular lines.

Another object of the invention is to provide an improved molding constructed of plastic material, which has an improved ornamental appearance and which may be manufactured and applied in a highly efficient manner.

Other objects of the present invention will become apparent from the following specification, from the drawing relating thereto, and from the claims hereinafter set forth.

For a better understanding of the invention, reference may be had to the drawing wherein:

Figure 1 is a fragmentary view and in cross section, illustrating bead molding constructed according to one form of the invention.

Figures 2, 3, 4, and 5 are other views similar to Figure 1, illustrating other forms of the invention.

Referring to Figure 1, the molding comprises a thin metal member 10 having a flat web portion 11 and a folded bead portion 12 at one edge of the flat portion. Adjacent the web or flat portion 11, the bead 12 has substantially flat edge sections 13 and 14 and the metal between these edge sections is curved as indicated at 15. The bead portion 12 is covered by solidified plastic 20 that fits the bead snugly with the edges of the plastic extending under the sections 13 and 14 at least sufficiently to hold the plastic on the bead.

The metal member may comprise an inexpensive low carbon steel of hot or cold rolled character or it may comprise other steel such as stainless steel, although the latter is more expensive. The plastic may be of different types now known, such as resinous or cellulose base types of plastics and it may be shaped and then telescopically associated with the bead, or flat strips of the metal and plastic may be simultaneously shaped and associated through rolling or shaping operations, it being understood that the plastic ordinarily would have to be heated to some extent in order to allow the shaping required. The plastic may be of different colors, or it may be transparent, and if transparent, it will be appreciated that the metal bead will be visible through it. In this event, a polished or other ornamental surface on the metal may be desirable since it would be visible through the plastic.

Molding of this type may be used between metal parts, such as between the fender and body of an automobile, and when so used, the flat or web portion 11 projects between the metal parts and the bead covers the line of separation of the body and fender, and thus greatly covers and improves the appearance of the junction line. The construction may be varied to provide considerably different appearances depending upon the plastic colors employed and, as stated before, if the plastic is transparent, the appearance may be varied widely considerably, depending upon the appearance of the steel bead within the plastic covering.

Figure 2 illustrates bead molding comprising a core 25 enveloped by a fabric 26 which extends from the core in laminated relation to provide a web 27. The laminations in the web may be cemented together and the fabric around the core 25 may be cemented to the latter if desired. The bead thus formed at one edge of the laminated web section is covered by a plastic covering member 28 which may be similar to that described in connection with Figure 1. Different appearances may be obtained similarly to the manner described in connection with Figure 1 although in this case if a transparent plastic is employed, the appearance may be considerably altered by the fact that fabric is used instead of metal. Different colored fabrics may be also employed in connection with the transparent plastic and in this way the appearance may be changed widely.

Figure 3 shows a construction on the order of Figure 2 with the exception that between the plastic 28 and the fabric 26, a thin metal bead element 30 is provided in enveloping relation to the fabric. This metal element has its edges reversely and outwardly folded as indicated at 31 and 32, in embracing and interlocking relation to the edges of the plastic. It will be observed in this case that when the bead is applied in the manner heretofore stated, the metal edges 31 and 32 may contact with the fender and body surfaces. This construction insures retention of the edges of the plastic in position, and is reinforcing to the assembly, especially when bending of the bead in the plane of the web is effected.

In the construction shown by Figure 4, the core 25 is covered by thin metal 35 that extends from the core in laminated relation as indicated at 36. This construction has its bead portion and a part of the laminated section covered by plastic 37 and the edges of the plastic extend along the web or laminated portion for a short distance as indicated at 38 and 39. The plastic and metal in this construction may be on the order of that described in connection with Figure 1 and it will be understood in either construction that the metal may be thin enough to facilitate bending of the molding in the plane of the web.

In the construction shown by Figure 5, the core 25 is covered by plastic element 40 that has an integral plastic leg 41 extending therefrom to provide the web for the molding. This construction is simple and inexpensive to manufacture and the plastic employed may be on the order of that described in connection with the other figures.

Although more than one form of the invention has been illustrated and described in detail, it will be apparent to those skilled in the art that various modifications may be made without departing from the spirit and scope of the appended claims.

What is claimed is:

1. A bead molding comprising a strip of thin metal folded to provide a hollow metal bead having edges terminating adjacent each other, and a thin covering of solidified plastic covering the bead and having its edges terminating adjacent the edges of the metal bead, the edges of the latter being folded respectively about the edges of the plastic covering so that such edges are interlocked one with the other.

2. A bead molding comprising a strip of thin metal folded to provide a hollow metal bead having edges terminating adjacent each other, a thin covering of solidified plastic covering the bead and having its edges terminating adjacent the edges of the metal bead, the edges of the latter being folded respectively about the edges of the covering in interlocking relation thereto, and a flexible web member or leg projecting outside of the bead and having a portion projecting inwardly into the bead between said edges.

3. A bead molding comprising a strip of thin metal folded to provide a hollow metal bead having edges terminating adjacent each other, a thin covering of solidified plastic covering the bead and having its edges terminating adjacent the edges of the metal bead, the edges of the latter being folded respectively about the edges of the covering in interlocking relation thereto, a filler core within the bead, and a web member mainly outside of the bead and having an edge portion projecting between said edges and being folded about said filler core within the bead.

4. A bead molding comprising a strip of thin metal having one edge folded over to provide a bead along such edge of the strip, and a thin covering of solidified plastic encasing the bead.

5. A bead molding comprising a strip of thin metal having one edge folded over to provide a bead along such edge of the strip, and a thin covering of solidified plastic encasing the bead, said plastic being substantially transparent so that the bead is visible through the plastic.

ORLEY J. CROWE.